March 25, 1924.
M. BONTEMPI
EXPRESS COFFEEPOT
Filed Oct. 25, 1922
1,488,089
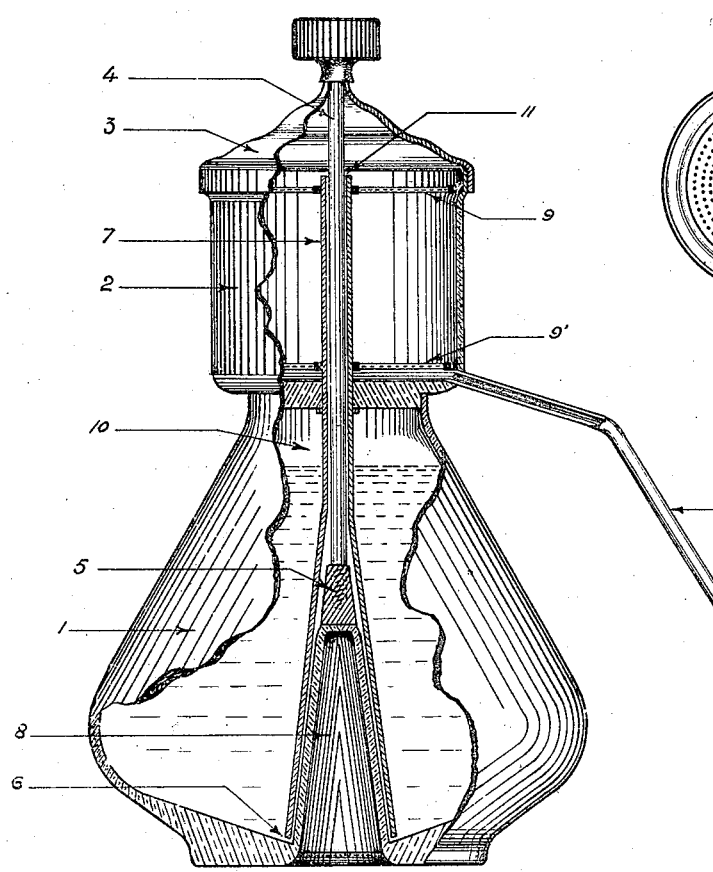
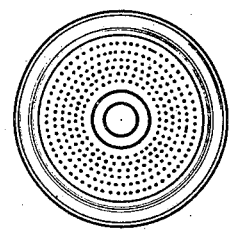
Inventor
Mario Bontempi Patented Mar. 25, 1924.

1,488,089

UNITED STATES PATENT OFFICE.

MARIO BONTEMPI, OF NEW YORK, N. Y.

EXPRESS COFFEEPOT.

Application filed October 25, 1922. Serial No. 596,815.

*To all whom it may concern:*

Be it known that I, MARIO BONTEMPI, a subject of King of Italy, residing at New York city, in the county of Bronx and State of New York, have invented an Improvement in Express Coffeepots, of which the following is an exact description.

The object of this invention is to prepare coffee with an "aroma" of an entirely distinct fragrance in a very short time on gas heater.

Fig. #1—coffee-pot in its lateral section.

Fig. #2—is the horizontal view of one of the filters.

Referring to Fig. #1 we find it consisting of a conical boiler (1), a cup (2) and a cover (3). All of these parts are firmly held together with a bolt (4) which is screwed in the center of piece (5) fixed in the upper part of the conical cavity (8) of the boiler. Through the center of the bottom of the cup (2) there is a tube fastened (7), its upper part being as long as the height of the cup, and the lower side nearly reaching the bottom of the boiler (1) in this section to give room to the conical cavity (8) with a diameter slightly larger in order to allow a small quantity of water to pass through. The boiler (1) is filled before with ⅜ of water; the cup (2) is filled with ground coffee which remains enclosed between the two filters (9) (9′).

The conical cavity (8) affords a larger area of heating, which brings the contained water to a boiling point in a few minutes freeing a vapor in that empty part of the boiler (10) tightly closed by the bottom of the cup (2). This vapor throws the water in (6) through the tube (7) from which it drops boiling through filter (9) and ultimately comes out in fragrant coffee from tube (12), fixed on the lower part of the wall of the cup (2) and directly under filter (9′).

I claim—

1. A coffee pot comprising a boiler open at the top, a cup having a bottom to be fitted to the top of the boiler and close same, the boiler having a cavity in its bottom, a cover for the cup, and a connecting member passing through said cover and the bottom of the cup and fastened to the bottom of the said boiler adjacent the centre of said cavity, to hold the cup, the cover, and the boiler together.

2. A coffee pot comprising a boiler having an open top, a cup having a bottom to fit said top and close the same, a cover for the top of the cup, the boiler having a cavity in the bottom, a filter in the top of the cup, a second filter adjacent the bottom of the cup and above the bottom. the cup having an outlet between said second filter and the bottom, a connecting member passing through the cover, the bottom of the cup and said filters, and secured to the bottom of the boiler adjacent the centre of the cavity to hold the cover, the cup and the boiler together, and a pipe surrounding said member and communicating at its lower end with the boiler and passing through the bottom of the cup and the filters therein, and communicating with its other end with the inside of the cup above the upper filter, whereby the contents of the boiler can flow up into the cup and down through the ground coffee between the filters, the grains of coffee being retained between said filters while only the liquid can pass through the outlet.

In testimony whereof I hereto affix my signature in presence of these witnesses.

MARIO BONTEMPI.

Witnesses:
 PROPARIO FROSCA,
 CLEMENTE LISCIS.